(12) United States Patent
Hickey et al.

(10) Patent No.: US 6,910,220 B2
(45) Date of Patent: Jun. 21, 2005

(54) DEMAND-BASED GOAL-DRIVEN SCHEDULING SYSTEM

(75) Inventors: Richard J. Hickey, Yorktown Heights, NY (US); William W. Webber, Ambler, PA (US)

(73) Assignee: Radio Computing Services, Inc., White Plains, NY (US)

( * ) Notice: Subject to any disclaimer, the term of this patent is extended or adjusted under 35 U.S.C. 154(b) by 571 days.

(21) Appl. No.: 10/127,122

(22) Filed: Apr. 19, 2002

(65) Prior Publication Data

US 2003/0050997 A1 Mar. 13, 2003

Related U.S. Application Data (60) Provisional application No. 60/285,135, filed on Apr. 20, 2001.

(51) Int. Cl.[7] .............................. H04N 5/445; G06F 3/00; G06F 13/00

(52) U.S. Cl. ..................... 725/39; 725/93; 709/219

(58) Field of Search ................. 725/37, 39, 87, 725/93, 97; H04N 5/445; G06F 3/00, 13/00

(56) References Cited

U.S. PATENT DOCUMENTS

| | | | | |
|---|---|---|---|---|
| 5,629,732 A | * | 5/1997 | Moskowitz et al. | 725/102 |
| 5,787,001 A | * | 7/1998 | Dietrich, Jr. et al. | 700/97 |
| 6,591,153 B2 | * | 7/2003 | Crampton et al. | 700/103 |

* cited by examiner

*Primary Examiner*—Vivek Srivastava
(74) *Attorney, Agent, or Firm*—Milde & Hoffberg, LLP (57) ABSTRACT

A Scheduling System is disclosed for automatically scheduling music performances as would be used in professional radio broadcasting. The general-purpose system is a demand-based, goal-oriented scheduler that can be implemented for scheduling program elements (such as songs) to create playlists. This system supports dynamic format customization based on preference feedback.

38 Claims, 7 Drawing Sheets

DEMAND-BASED GOAL-DRIVEN SCHEDULING SYSTEM

CROSS REFERENCE TO RELATED APPLICATION

This application claims priority from U.S. Provisional Patent Application Ser. No. 60/285,135, filed Apr. 20, 2001.

BACKGROUND OF THE INVENTION

Introduction

This is a time of tremendous change for music "Radio": the broadcast of audio musical performances to the listening public. In the past, such broadcasts took place exclusively over the "air" with only limited (e.g. telephonic) opportunity for direct feedback from listeners. Today Internet audio streaming of music is rapidly increasing, and Radio Stations are finding they have proven, viable brands and audiences they can leverage and serve in this new medium.

As a result of this change in requirements for music radio, unique demands have been placed upon the scheduling of musical performances. The present invention provides a method of scheduling performances that can be applied to radio broadcasting as well as to other areas of commerce. Within the radio industry, the method is capable of generating music playlists that can be used in traditional over-the-airwaves radio broadcasting or in internet-based radio. This scheduler achieves or exceeds the objectives of professional music scheduling systems, and it introduces new capabilities that address the new requirements for internet radio. It is a demand-based, goal-oriented scheduler (rather than a rule-based model). In the radio music scheduling domain, it achieves professional-level scheduling with the option of dynamic format customization based on inputs from other sources such as—in the case of internet application—listener preferences being fed back.

As used herein, the term "media performance", abbreviated "MP" is a generic term intended to embrace all types of media performances. These include audio performances (musical or otherwise), advertisements or commercials (as might appear on television or on the web, for example); video performances (such as broadcast television performances); animation (e.g., computer-generated clips); web page elements (banner ads and the like) and even web pages themselves. All such media performances or "MPs" require scheduling. By way of example, and as a best mode of practicing the present invention, the present invention will be described in connection with music scheduling at a radio station.

The 'Art' of Music Scheduling at a Radio Station

The art of music scheduling consists of selecting a sequence of musical performances, from a finite library, to compose a schedule. The primary consumers of automated music scheduling systems are Radio Stations, who use them to determine the sequence of musical performances played on air. A salient characteristic of music schedules is that musical performances are repeated, i.e., that the library is finite, and that listeners are interested in hearing musical performances more than once. So music scheduling systems are concerned with both the relationships between different musical performances in the schedule, and the relationships between different occurrences of the same musical performance, in particular the frequency and spacing between occurrences.

Consumers of automated music scheduling systems have several objectives:

Play musical performances at different frequencies/rotations

Ensure that current hits play more frequently than older musical performances.

Maximize library variety

If a station has a limited number of musical performances with a particular "attribute" (e.g., "rap music") such performances should be spread out over time rather than appear in bunches. If a station has a lot of a particular kind of musical performance, they too should be spread out so as to avoid getting in a "rut," where the listener's perception will be that that is the only kind of music played by the station.

Avoid clashes

Musical performances with certain characteristics do not work well when played adjacent to other musical performances with the same or other characteristics. Adjacencies between such musical performances should be avoided.

Prior Art of Music Scheduling

Rule-based Music Schedulers

There are several known commercial systems for automated music scheduling for radio broadcasters. These systems allow radio programmers (Program Directors or "PDs") to enter musical performance ("MP") data, including many MP attributes. MP's are assigned to category queues, and "clocks" are defined, which are schedule templates (typically an hour long) consisting of a sequence of categories. Rules are defined, such as "Don't play MP's with this attribute next to MP's with that attribute," or "Don't play two MP's by the same artist closer together than 90 minutes." Scheduling consists of "filling in" the clocks following the rules. For each clock position (which consists of a request for an MP from a particular category), some subset of MP's from the front of that category queue are tested for success in passing the various rules. The most successful MP is placed in that position in the schedule, and then moved to the back of the category queue.

Two significant characteristics of basic music scheduling systems are:

Musical performance play frequency is derived from category membership and the clocks If an MP is one of ten MP's in category A, and category A is called for twice per hour in the clocks, then that MP (and all MP's in category A) will have an average play frequency of "once every five hours."

Rules contain many fixed values (such as durations and counts)

Rules must be set with full and complete knowledge of the music library, and with considerable effort and skill, in order to ensure that they are satisfiable, and accomplish the scheduling objectives.

Personalized Music Scheduling

Personalized music services are a recent phenomena, made possible by the web and audio streaming technologies. Most allow listeners to rate musical performances on some scale: on a scale of 1 to 10, thumbs up or down, etc. Some allow listeners to rate artists and albums as well. Some systems use this information to create a custom schedule, others use it to place listeners in a pool with people of similar tastes, all of whom get the same schedule. Some systems allow listeners to "ban" musical performances/artists/albums so that they no longer appear again. Some systems allow listeners to select a predefined "station," either one provided by the service or a terrestrial broadcast station, to serve as the starting point for their personalized schedule.

SUMMARY OF THE INVENTION

A principal object of the present invention is to provide a method of selecting and producing schedules of media performances (MPs) for play within a plurality of successive schedule positions (SPs) from among a finite plurality of MPs (MPSETS), such that certain scheduling goals (GOALs), selected by the scheduler, are met. A more particular object of the present invention is to provide a method for assigning MPs to play in individual ones of the successive SPs, which can be varied at will by not only the person or persons setting the GOALs (e.g., a broadcast station or web site manager) but also a consumer (e.g., a listener or viewer).

These objects, as well as further objects which will become apparent from the discussion that follows, are achieved, in accordance with the present invention, by a method wherein each MP is associated with a demand value (MPD) such that the sum of the MPDs for all MPs in the MPSET is equal to a constant K, and each MP is associated with zero or more attributes (ATTRs) from a plurality of attributes. The method minimizes the failure value (FV) of one or more of the scheduling goals (GOALs) from a finite plurality of goals (GOALSET), each goal having a goal type (GT) and an importance value (IV).

According to the invention, the method comprises the steps of:

(a) storing the identity of each MP with its associated demand value (MPD) and its associated attributes (ATTRs), if any;

(b) storing the identity of each GOAL with its associated goal type (GT) and its associated importance value (IV);

(c) assigning the MPs to play in individual ones of said successive SPs, with one MP scheduled to play in each SP, such that for each SP, the assigned MP has the lowest failure value (FV) of the MPSET;

wherein the failure value (FV) for each respective MP in a given SP is calculated in accordance with the formula:

$$FV = TS/TIV$$

where TS is the sum of scores (Ss) of the applicable GOALs (AG), and TIV is the sum of the importance values (IVs) of the AGs, where an AG is any GOAL that applies to all MPs or any GOAL that applies to any of the attributes associated with the MP, and where the score (S) for each respective AG is the square of the degree of failure (DF) of the MP to satisfy the AG in the SP times the IV of the AG (S=(DF*IV) 5), where DF is the result of a test for the given GT and is dependent upon the respective MP and the given SP (DF= Test$_{GT}$(MP, SP));

whereby the number of SPs between successive scheduled SPs in which each respective MP is scheduled to play (MPERIOD) is as close as possible to the constant K divided by the demand value MPD for that respective MP; and whereby the number of the SPs occupied by each respective MP divided by the total number of SPs during a given range of successive SPs is as close as possible to the demand value MPD for that MP divided by K.

The present invention provides a scheduling method that, when applied to music radio, creates playlists for broadcast or individually customized playlists for each listener. The scheduler uses three "inputs" for producing the playlists: (1) the basis format of a radio station (its MP library, attributes, goals and priorities); (2) format adjustments received from another source (which could be individual listener preferences, PD-input parameters for dayparting, or a number of others); (3) actual play history (either individual listener history or station history).

The playlists produced, therefore, are customized versions of the basis-format, adjusted according to preference requests. This invention is thus applicable to implementation in, for example, an internet music radio environment that permits per-listener adjustments, providing adaptive modifications to the format based on each listener's preferences.

Example Implementation: An Internet Music Radio Station

To summarize this invention, the following sections deal with the example of an internet-radio station that permits per-listener format adjustments. Many of the terms used are common to radio broadcasting ('adds' means a new MP into the station's library).

Customizing the Radio Station

The basis for the schedule is always the "hallmark" or "sound" or "brand" of the Radio Station—its musical performances, its turnovers, its categories, its attributes, its goals. Given a few reports from the Radio Station's music scheduling system, the present invention tracks the musical performance 'adds,' category changes, etc., resulting from the listener's preferences.

With the Music Scheduling System according to the invention, listeners can indicate their preferences, in terms of boosting, reducing or banning certain MP's or artists as they hear them. At no point does the listener actually "choose" music or build playlists by selecting specific songs. The Music Scheduling System uses a dynamic format compensation to accommodate the listener's preferences, while maintaining professional formatic control over turnover, separations, spreads, attribute adjacency prohibitions and DMCA constraints. Consequently, the Music Scheduling System is not a simple jukebox or play list system, but provides true radio scheduling based on professionals at the Radio Station who understand radio scheduling.

Depth—Variety and Choice in the Context of a Radio Station

To accommodate the desire for more variety and choice from an Internet broadcast, the Music Scheduling System according to the invention can create depth categories and fill them with musical performances that the Radio Station does not currently play on air, but that make sense in the context of its Internet format. Listeners can opt into hearing these 'deep cuts' on a per-artist basis, or by using "attributes" of the Radio Station.

Attribute-based Adjustment

The Internet Radio Station can expose one or more of its "attributes" for listener adjustment. In particular, it may allow its listeners to boost, reduce or ban attributes that the station defines: examples could be rap, love songs, grunge, metal or whatever makes sense for that station. This gives the listeners a powerful way to quickly contour the station to their preferences.

Presets

According to the invention, any attribute-based adjustments, prescribed by listeners or as predefined by the PD, can be stored in "presets." For example, the station's format with "more Latin" can be set up as a preset. Therefore, the station can create presets and pre-populate the player with them (e.g.: no rap, more love songs, etc). In addition, each listener can save his/her own attribute adjustments in presets.

Subsidiary Objectives

The Music Scheduling System according to the present invention has two subsidiary objectives: (1) dynamic format customization, and (2) producing broadcast quality playlists.

(1) Dynamic customization of a station format

Adjustment of play frequency (rotation) on a per-MP, per-artist, or per-attribute basis Adjustment of musical performance inventory Adjustment of library-wide runtime attributes (2) Producing broadcast-quality music schedules:

Playing MP's at different frequencies/rotations

Maximizing library variety

Avoiding clashes

Supporting schedule composition control

In Brief

In summary, the Scheduling System according to the present invention introduces a goal-oriented approach that permits adaptive format modification based on requests for adjustment from any number of sources. In the example realm of radio, this scheduling invention with the notion of goals and per-MP-demand, introduces new dynamism and flexibility. Its application of the notion of dynamic format modification combines ease-of-use with powerful adjustment capabilities.

For a full understanding of the present invention, reference should now be made to the following detailed description of the preferred embodiment of the invention as illustrated in the accompanying drawings.

DESCRIPTION OF THE PREFERRED EMBODIMENTS

Set forth below are the fundamental issues underlying the design of the Music Scheduling System according to the present invention. First, the basic objectives of the System are described. Next, the same objectives are revisited in terms of the implementation strategy used. Finally, the software implementation of the Music Scheduling System is described in detail, in workflow order, in connection with FIGS. 2–6.

Specific Objectives

The three primary objectives of the scheduler are described as:

A. Dynamic format customization

B. Produce broadcast quality music schedules

C. Be fast and scalable

A. Support Dynamic Customization of a Station Format

The Music Scheduling System according to the invention takes as input a station format which shall be used as the basis format for adjustment. A station format consists of a set of musical performances (e.g., songs), a possible specification of attributes of those musical performances, their intended play frequencies, and other scheduling objectives.

Two fundamental concepts apply when discussing adjustments: (1) the basis format is presumed good, i.e. it was developed by a radio professional; and (2) the basis format is dynamic, subject to ongoing change and refinement. Thus, any adjustments are to be expressed as deltas to the station format ("Play this song more often than the station plays it"), and never as absolutes ("Play this song once every four hours").

The adjustments supported are:

Adjustment of play frequency on a per-MP, per-artist, or per-attribute basis

This capability is exposed via boost and reduce controls, expressing the fundamental notion of "play this musical performance/artist/attribute more/less often than does the station."

Adjustment of musical performance inventory

MP's can be removed from consideration for play via banning, and MP's can be introduced that would not normally play on the station via depth.

Adjustment of library-wide runtime attributes

The above boost/reduce/ban/depth adjustments can be made for broad, potentially overlapping partitions of the music library, like "Love Songs" or "Slow Songs."

A further sub-objective related to per-listener customization:

Optimize rotations for each listener

The system should leverage the fact that schedules are being generated on a per-listener basis, and in particular, maintain and leverage information about what the listener has heard.

B. Produce Broadcast-quality Music Schedules

While the Music Scheduling System may work differently from current commercial music schedulers, and may be applied to non-traditional scheduling tasks (i.e. personalized scheduling), it should produce schedules of quality comparable to those used in radio broadcasting. Towards that end, the system must support professional schedule quality objectives:

Play musical performances at different frequencies/rotations

Ensure that current hits play more frequently than gold.

Maximize music library variety

If a station has a limited amount of MP's with a particular attribute, they should be spread out over time rather than appear in bunches. If a station has a lot of a particular kind of MP, they too should be spread out so as to avoid getting in a rut, where the listener's perception will be that that is the only kind of music played by the station.

Avoid clashes

Musical performances with certain characteristics don't work well when played adjacent to other MP's with the same or other characteristics.

In addition, a new objective arises due to customization:

Support schedule composition control

Due to customization adjustments, a station's sound can drift substantially from the original format. Global controls should be provided to ensure the integrity of the schedule composition at a high level.

Since the vast majority of basis stations will be programmed using an automatic music scheduling system designed for over-the-air broadcast Radio Stations, a useful metric for quality is:

In the absence of adjustment, produce a schedule comparable to the station broadcast schedule produced by a Radio Station It is important that the basis station be accurately reflected in the Music Scheduling System according to the invention.

C. Be Fast and Scalable

While it is always desirable for software to be fast, some of the potential applications for the Music Scheduling System may require very high-volume scheduling, on the order of tens of thousands of schedules per hour. The System must therefore scale such that adding additional machines to a system provides for additional scheduling throughput.

Implementation Strategy

This section describes the implementation strategy used to achieve the three primary objectives.

A. Support Dynamic Customization of a Station Format

Support for adjustment of play frequency on a per-musical performance, per-artist, or per-attribute basis Because adjustments can apply across overlapping partitions of the music library, and because multiple adjustments may affect any one musical performance, it is necessary to be able to represent a unique play frequency per MP. However, because it is impossible to produce perfect schedules, not every MP will play at its specified frequency, so it becomes useful instead to talk about the intended frequency for an MP. This intended frequency is expressed as the MP's demand, i.e. that portion of the airtime (or in the case of a slot-based playlist, that fraction of the available schedule slots) that ought to be occupied by a particular musical performance.

Demand is a critical notion; it can be expressed not only for MP's, but also for artists, categories and other attributes. In addition, demand has the useful property that it is easy to use in arithmetic, because it can be readily summed etc. Demand is expressed as a floating point number between 0 (no demand) and 1 (all available airtime).

Given per-MP demand, boost and reduce can be implemented in terms of adjustments to demand. Such adjustment is called shift internally. When a request is made to shift something, the results should be tangible, yet balanced and appropriate. This translates in practice to a non-linear model where boosts to items with low demand result in drastic increases in demand (as a percentage), whereas boosts to items already in high demand result in small increases. The system supports multiple requests to boost or reduce. Each request either increments or decrements a shift amount by 1. Requests for shift greater than 1 or less than −1 are done iteratively, i.e. a new baseline demand is calculated at each step and used as the basis for the next step. Boosts are done using a different formula than reductions, for subjective perceptual reasons.

Many shifts, such as those for artists or attributes, affect multiple MP's. Demand for all affected MP's is summed and used as the basis for the shift. Once an amount of shift has been calculated, it is divided up among the affected musical performances in proportion to their contribution to the summed demand.

Support for adjustment of musical performance inventory

Banning is straightforward: musical performances that are banned, MP's by artists that are banned, and MP's having attributes that are banned are removed from consideration for scheduling. Because each MP has its own demand, there are no side effects (such as an increase in demand for the remaining MP's in the same category).

Depth is implemented by having one or more depth categories above and beyond the normally scheduled Radio Station categories. These depth categories are filled with MP's that are compatible with the station format but aren't normally played. Depth MP's can be introduced ("depthed-in") by opting in to depth for an artist or an attribute. Since depth MP's are not normally played, they have no demand on the basis format, so the demand at which they are introduced must be explicitly set.

Musical performances depthed-in by artist have their demand determined by a setting on the containing depth category. This setting determines the demand for any single artist's MP's introduced from the category, and is divided up amongst all the MP's by an artist in that category. For example, a depth category with a demand setting of 0.01 will cause any artist's MP's to enter with a total demand of 0.01, so if artist A has 10 MP's in the category, depthing in artist A will cause each MP to enter with a demand of 0.001. If artist B has 2 MP's in the same category, depthing in artist B will cause each MP to enter with a demand of 0.005.

Musical performances depthed-in by attribute have their initial demand set by the station parameter (discussed below) underlying that attribute. This demand is divided up equally amongst the MP's depthed in by the attribute.

Adjustment of library-wide runtime attributes

Runtime attributes such as 'Love Songs' or 'Slow Songs' are defined via station parameters. A station parameter specifies a category, a value of an attribute, or a range of values of an attribute as its basis. All musical performances meeting the parameter criteria will be considered to have the corresponding runtime attribute. The station parameter also specifies which of shift/ban/depth are allowed for the attribute, as well as the initial demand if depth is supported. Runtime attributes allow for arbitrary partitioning of the musical performance library.

Requests for shift/ban/depth of runtime attributes are supplied at schedule request time (thus "runtime"), and are not stored in the database (as a property of the listener, for example)

Optimize rotations for each listener

Listening history must be efficiently maintained on a per-listener basis, and must be as small as possible, because there could be hundreds of thousands of listeners. For each musical performance heard by each listener, only the following information is maintained:

lastplay—a schedule slot number indicating the last slot in which this MP played. For each listener, the schedule is treated as a continuum of incrementally numbered slots. Each scheduling session generates and fills the next n slots.

playdeficit—a running total indicating how far behind (or, if negative, how far ahead) an MP is in meeting its demand over time.

This information is minimal yet complete, and sufficient for the Music Scheduling System to meet its objectives.

B. Produce Broadcast-quality Music Schedules

The Goal System

Figure 6:
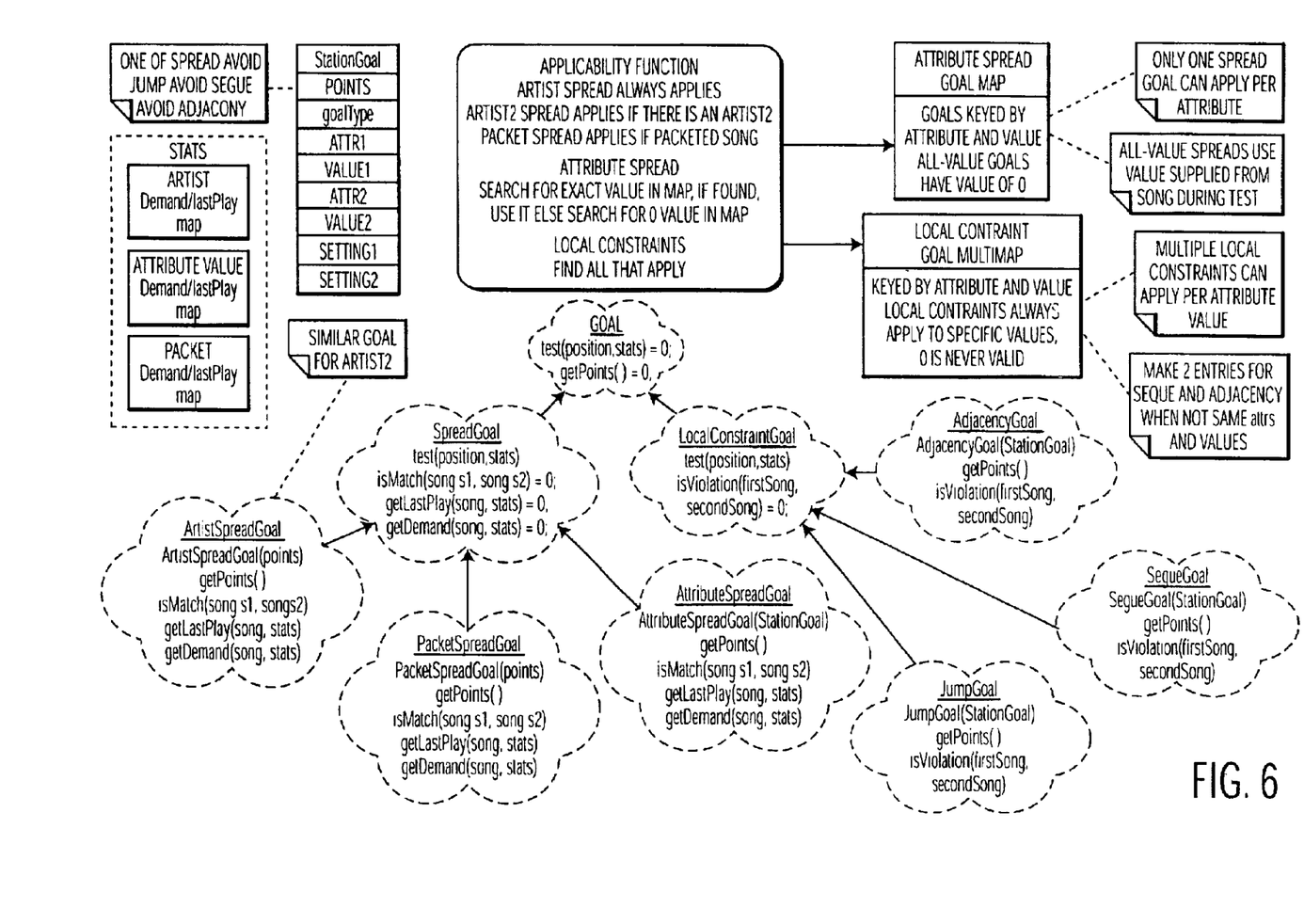
FIG. 6 ("Station Goals") is a block diagram describing the calculation of MP's meeting the Station goals.
Figure 7:
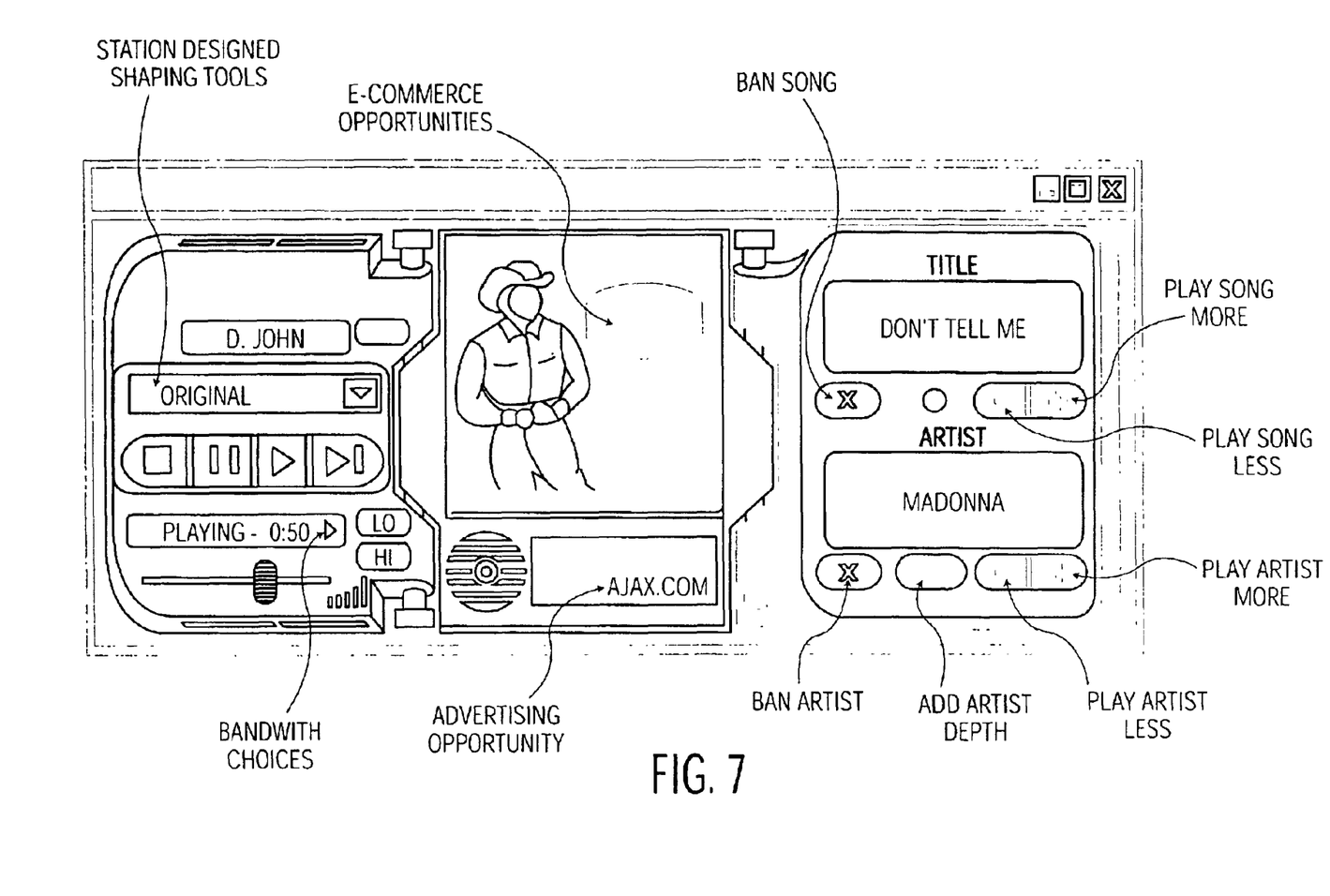
FIG. 7 is an annotated picture of a player—the control device that a listener uses to indicate preferences (adjustments).

A goal-based scheduling system is used instead of the traditional rules-based approach (FIG. 6).

Traditional music scheduling systems allow users to pursue their scheduling objectives by establishing various rules.

These rules incorporate many fixed values—durations or counts, and must be set with full and complete knowledge of the music library, and considerable effort and skill, in order to ensure a) that they are satisfiable, and b) that, when satisfied, they do in fact accomplish the scheduling objectives.

Due to the requirement to support dynamic format modification, both of library membership and MP rotations, rules are unworkable. In the absence of dynamic library knowledge when set, there can be little confidence of ensuring (a) and (b) above. The goal-driven scheduler instead allows for direct expression of scheduling objectives, via goals, and, given its complete knowledge of the dynamic state of the library, takes on the task of calculating ideal values to be used in testing the satisfaction of the objectives. No absolute values are required (or desired).

The Music Scheduling System supports two types of explicit, user-supplied, goals: (1) spread goals, used to encourage MP's and classes of MP's to play at their ideal period, given their demand, and (2) local constraint goals, which deal with objectives regarding adjacent MP's.

In addition, there are several implicit goals which are always in effect: the goal to meet ideal demand/rotation for each MP, achieved with hunger and saturation (described below); artist spread; packet spread; and category spread.

Goals are prioritized by assigning points. Some goals, e.g. spread, can be met (or rather, fail to be met) to varying degrees.

The basic operation of the music scheduler requires an initial setup or preparation phase, plus the actual scheduling phase for each playlist generated. A brief description of the two phases follows (complete implementation details are in a later section).

Scheduler Phase: Preparation

The music library is brought in from the basis Radio Station, and initial demands are set from category assignments. Musical performance demands are adjusted to better match the behavior of the Radio Station's music scheduling system. Banned MP's are discarded. Depth musical performances not depthed in are discarded. Demands are adjusted for shift. Schedule composition limits are applied, and the demands for all musical performances are brought into balance (scaled so that they sum to 1). Statistics (sums of demands and last plays) are calculated for all entities referred to by goals. A blank schedule, consisting of a number of slots, is generated. There are no clocks, no notion of time-of-day, nor MP runtimes.

Scheduler Phase: Playlist Generation

A single pass is made across the slots. For each slot, every MP is 'tested' to determine its suitability in that slot. The MP's are considered in next-due order—each MP that has already been heard has a next-due slot equal to its last play plus its ideal period (1/its demand). MP's that have not yet been heard are randomly ordered at the beginning of the consideration list. As each MP is tested in each position it receives a score based upon its failure to meet its goals and their respective points. The scoring is non-linear, with large failures penalized greater than sums of small failures. Since each MP may be subject to different goals (due to differing attributes), its score is the sum of its scores on its applicable goals, scaled by the sum of points of the applicable goals. Lower scores are better. The best MP (i.e., the MP with the lowest score) is scheduled in the slot, its next-due time calculated, and it is returned to the consideration list in next-due order. The scheduler yields no unscheduled positions.

Implementation Support of Quality Objective

To achieve the objective of producing professional radio quality schedules, the implementation specifically deals with 5 issues:

1. Playing MP's at Different Frequencies/Rotations

The final, adjusted demand on each musical performance dictates its ideal play frequency. The playDeficit maintained on each MP tracks success in meeting this demand over time. For each play of an MP, the interval between this play and the last is compared to the ideal period and the difference is added to the deficit. The deficit is then scaled by a decay factor so that it will not accumulate indefinitely.

Ideal MP rotation is achieved by two implicit goals: hunger and saturation. When MP's have a positive play deficit they are considered "hungry." Each MP receives a hunger score, which is the sum of positive play deficits on MP's passed in reaching this MP in the consideration list. For example, the hunger score for the 20th MP in the consideration list is the sum of the positive deficits of the first 19 MP's in the consideration list. This score is added to the scores for the other applicable goals for the MP, and like them, lower scores are better. Hunger tends to keep MP's from getting behind in their rotations.

Saturation is a penalty for playing a particular MP early enough to result in a negative play deficit for that MP. While it may seem that hunger would be sufficient (after all, if no MP was behind then no MP would be ahead), but in practice MP's will get behind, and without saturation the effect of their being behind can be unevenly distributed (i.e. concentrated) in some MP's that play ahead. With saturation, the cost of some MP's being behind is evenly distributed. Together, hunger and saturation cause MP's to track their ideal play frequency and meet their demand.

2. Maximizing Library Variety

The cornerstone of the Music Scheduling System is the spread goal. The spread goal uses the demand and last play statistics to determine the ideal frequency for any spread component (artist, attribute, packet etc). Its job is to test how close a play of an MP with that component comes to the ideal period. The spread goal uses two different tests, depending on the demand for the component. If the demand is less than 0.2, a separation (interval) test is used. For example, if a goal were set up to spread attribute X, then if a tested MP had that attribute X, that goal would apply. The spread goal would look up the library-wide demand for attribute X (calculated during preparation) and determine the ideal period. It would then look up the last occurrence of attribute X in the schedule (also precalulated), and compare the difference between this play and the last to determine the interval, then compare the interval to the ideal, yielding a fractional failure. If the demand is greater than 0.2, a sliding window test is used. Here, the sum of all occurrences of the component in all 5-slot windows surrounding the current position being tested are calculated, and the greatest is compared to the demand. For example, if the component occurred 3 times in a window, its failure would be the difference between 0.6 and the demand.

In both cases the spread goal encourages spread attributes to occur at their ideal period, thus maximizing the distance between plays of the same component.

3. Avoiding Clashes

Local constraint goals take three forms:

1. Avoid adjacency—don't play X next to Y
2. Avoid segue—don't play X after Y
3. Avoid Jump—don't let the value of X jump more than n up or m down in a single segue.

These goals directly implement the objective, and cannot be partially failed in the single-pass implementation.

4. Supporting Schedule Composition Control

All musical performances are in a category, and each category is in a category group. Each category group can be assigned a demand limit, which is then used to constrain the total demand of MP's in that group. For instance, if A1, A2, and A3 (e.g. current categories) were in category group 1, and the demand limit for group 1 were set at 0.2, then currents would never occupy more than 20% of air time. If the sum of the currents' demands were greater than 0.2, they would be scaled back to that limit during preparation. This gives high level control over schedule composition, which might otherwise become severely unbalanced after customization.

5. Produce "Broadcast-Quality" Playlists

The first job of matching a Radio professional or an automatic Radio Station Music Scheduling System is to match the musical performance rotations. The initial demands for MP's are based upon their category membership and category's projected turnover as supplied by the automatic scheduling system. MP's that are in packets, for example, have their demand divided by the number of MP's in the packet, thus reproducing the effects of packeting on rotation. The last step in matching rotations is to reproduce the "starvation" effect that occurs when an artist's inventory exceeds that which is allowed by the artist minimum separation setting. A pass-sensitive algorithm is utilized which progressively reduces demand for MP's in later pass categories to match the reduction in play that will occur in the automatic scheduling system. The idea is to produce achievable demands.

The next task is to reproduce the effect of packeting on the separation of intra-packet MP's. An implicit packet spread goal is used to spread MPs in the same packet. This system allows for musical performances in packets to have independent demands after adjustment, and is tolerant of some musical performances in a packet being banned.

Next, the scheduler must provide some facility for spreading out like categories, an objective manually realized in automatic scheduling clocks. A category spread goal is used to spread like categories. Eventually, all goals will be made available on categories to allow for goal-driven support of all clock objectives.

Finally, the scheduling objectives embodied in the station's rules must be met. This is done using goals. Currently, creating goals corresponding to the rules is a manual, back-office staff task, however it is possible to automate this.

C. Be Fast and Scalable

The Music Scheduling System according to the invention is preferably implemented to run on a web server. Multiple instances can run on multiple web servers, ensuring scalability in a web server farm.

A database server may be used, and database access may be highly optimized, both in the stored procedure and index architecture. Musical performance and station data is treated as read-only, and loaded only periodically into the scheduler object, where it is cached. Only listener data should be read on a per-scheduling-session basis; it is preferably optimized for minimal size.

Inside the scheduler all relational data is preferably turned into a network of pointers, avoiding any runtime lookup. STL is used throughout. During testing a particular musical performance, goal testing may be abandoned as soon as the MP accumulates a score greater than that of the highest scored MP so far.

Implementation of the Music Scheduling System in Software

The operation of the scheduler proceeds in three main phases (see FIG. 2 for details):
1. Loading, preparing and caching song and station data
   Load song and station data
   Calculate station song demands
2. Scheduling preparation
   Parse runtime settings
   Load listener data
   Get listener-adjusted songs
   Balance demands
   Calculate statistics
3. Schedule generation
   Fill schedule positions
   Update database
   Integrate links/spots and return schedule 1. Loading, Preparing and Caching Song and Station Data The scheduler server is designed to remain resident in memory on the web server machine, and to serve requests for schedules from multiple listeners against multiple stations. The master song library and station data is considered a read-only input to the scheduler, and as such it is loaded once and cached, rather than loaded on each scheduling request. Currently it is loaded during server object loading, which has the attribute of tying the cache lifetime to the DLL server lifetime, allowing for easy manual deterministic reloading. It is architected, however, to support successive loads during the same server lifetime with minimal thread contention, so that, for instance, the song and station data could be reloaded on a periodic basis.

Figure 1:
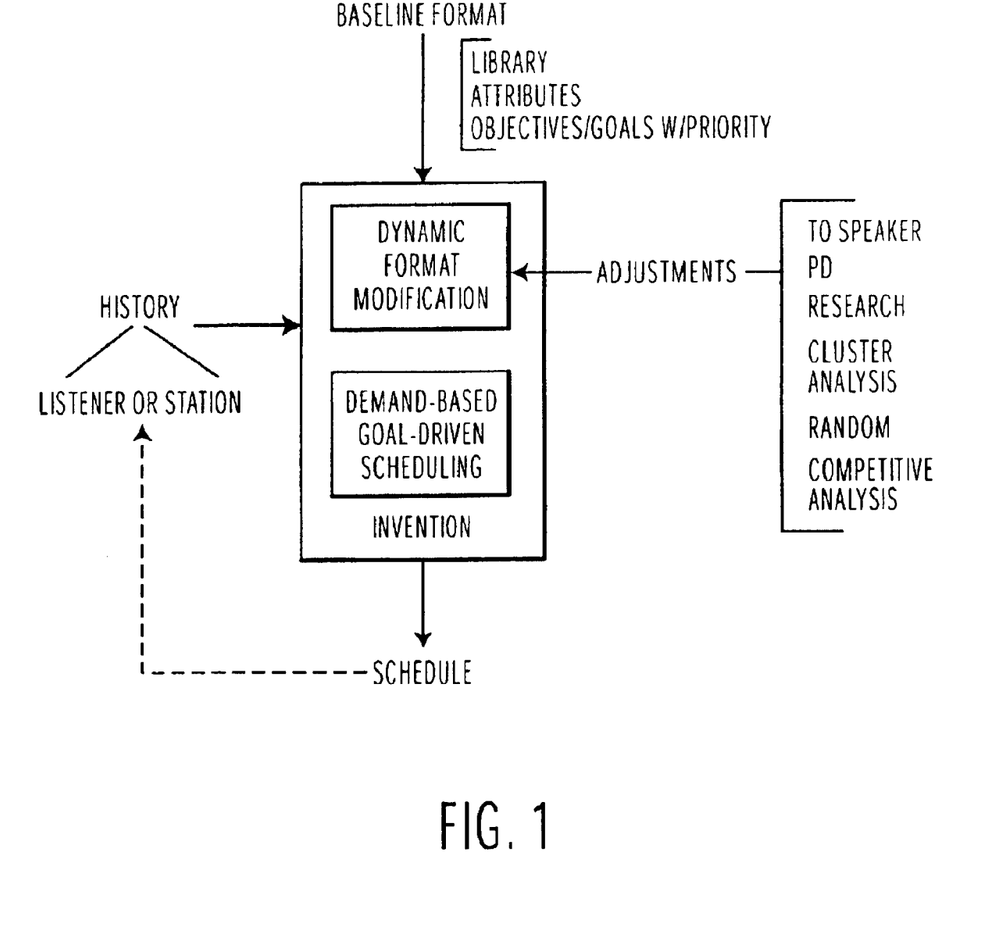
FIG. 1 ("Overall Schedule Process") is a representational diagram depicting the way this invention uses inputs from basis-format, adjustments and history to produce schedule (in this case a playlist of MP's.
Figure 2:
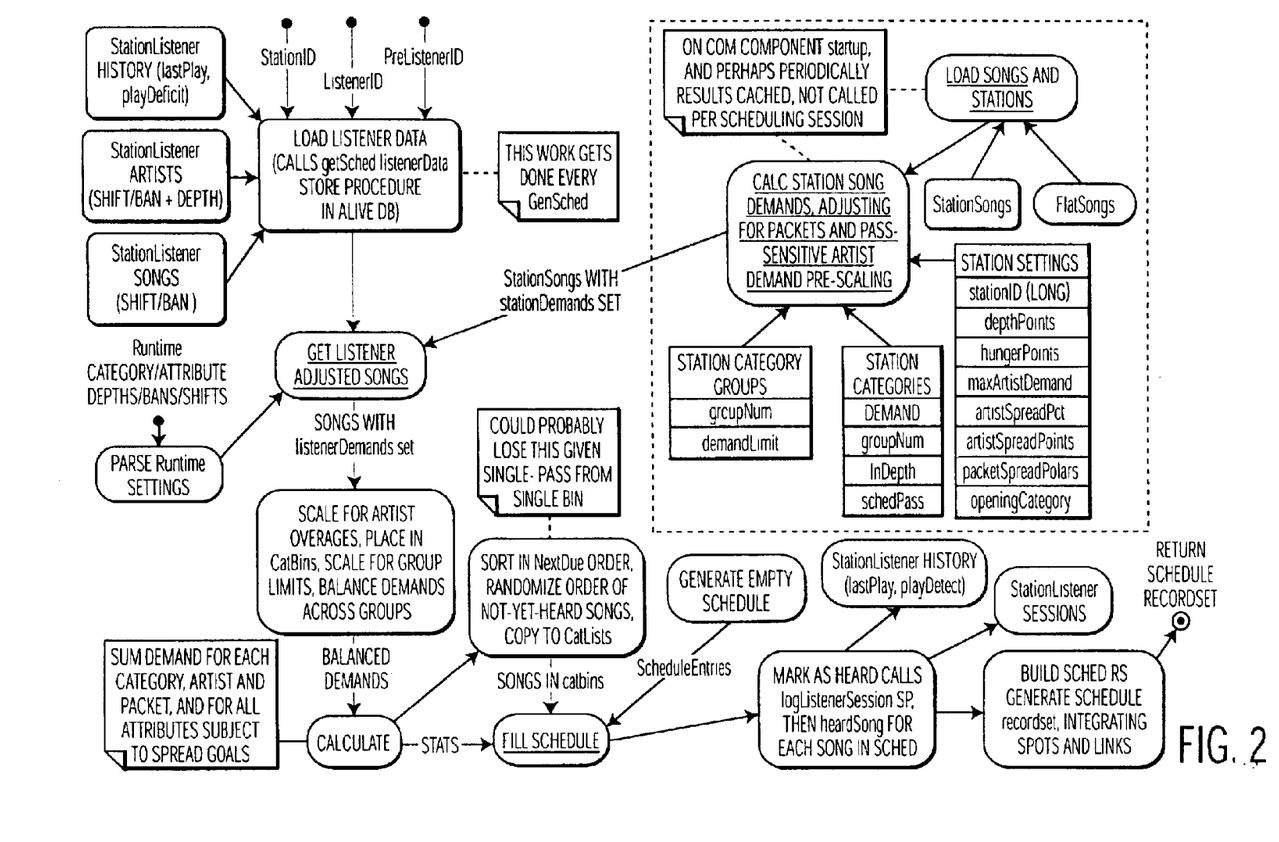
FIG. 2. ("Scheduler Top Level") is a block diagram of the Music Scheduling System according to the preferred embodiment of the present invention showing the interrelationship of the various modules. The process begins in the boxed upper-right quadrant and proceeds in the indicated counter-clockwise direction.

In FIG. 2 (the "Top-Level" diagram), this process is shown in the box occupying the upper-right quadrant. Within this process are two main procedures: (1) Load Songs and Stations, and (2) Calculate Station Song Demands.

a. Load Songs and Stations

Figure 3:
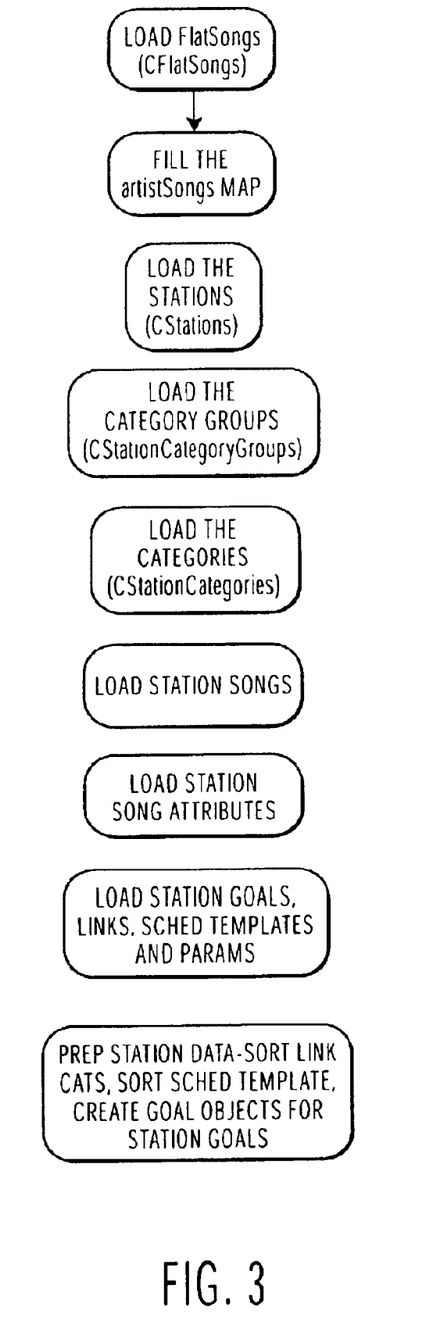
FIG. 3 ("Load Songs and Stations") is a block diagram showing one part of the preparation process of the Music Scheduling System of FIG. 2 for loading musical performances, stations, etc. during an initial setup of the system.

The following data is loaded (see FIG. 3 for the field details):

Flattened Songs
  The master song database is a normalized relational database with tables for songs, artists, albums, fulfillment data etc. This data is flattened in a realized view with one row per song. The data is pulled across and stored in a map by value, keyed by songID.

Stations
  The stations table is pulled across and stored in a map by stationed.

Station Category Groups
  Station category groups are pulled across and stored in a map, within their owning station, keyed by category group number.

Station Categories
  Station categories are pulled across and stored in a map, within their owning station, keyed by category number. The group to which the category belongs is looked up, and a pointer to it is stored in the category itself.

Station Songs
  Station songs are pulled across and stored in a map, within their owning station, keyed by songid. The category to which the station song belongs is looked up, and a pointer to it is stored in the station song itself. The flatsong to which the station song corresponds is looked up and a pointer to it is stored in the station song itself.

Station Song Attributes
  Station song attributes are pulled across and stored in a list, within their owning station song.

Station Links
    Station links are pulled across and stored in a map of lists keyed by category, within their owning station.
Station Goals, Station Schedule Template Entries, Station Parameters
    All above are pulled and stored in corresponding lists within their owning station.
At this point the data is efficiently stored, with most relational lookups done once and reconstructed as either contained data or direct pointer references.

Figure 4:
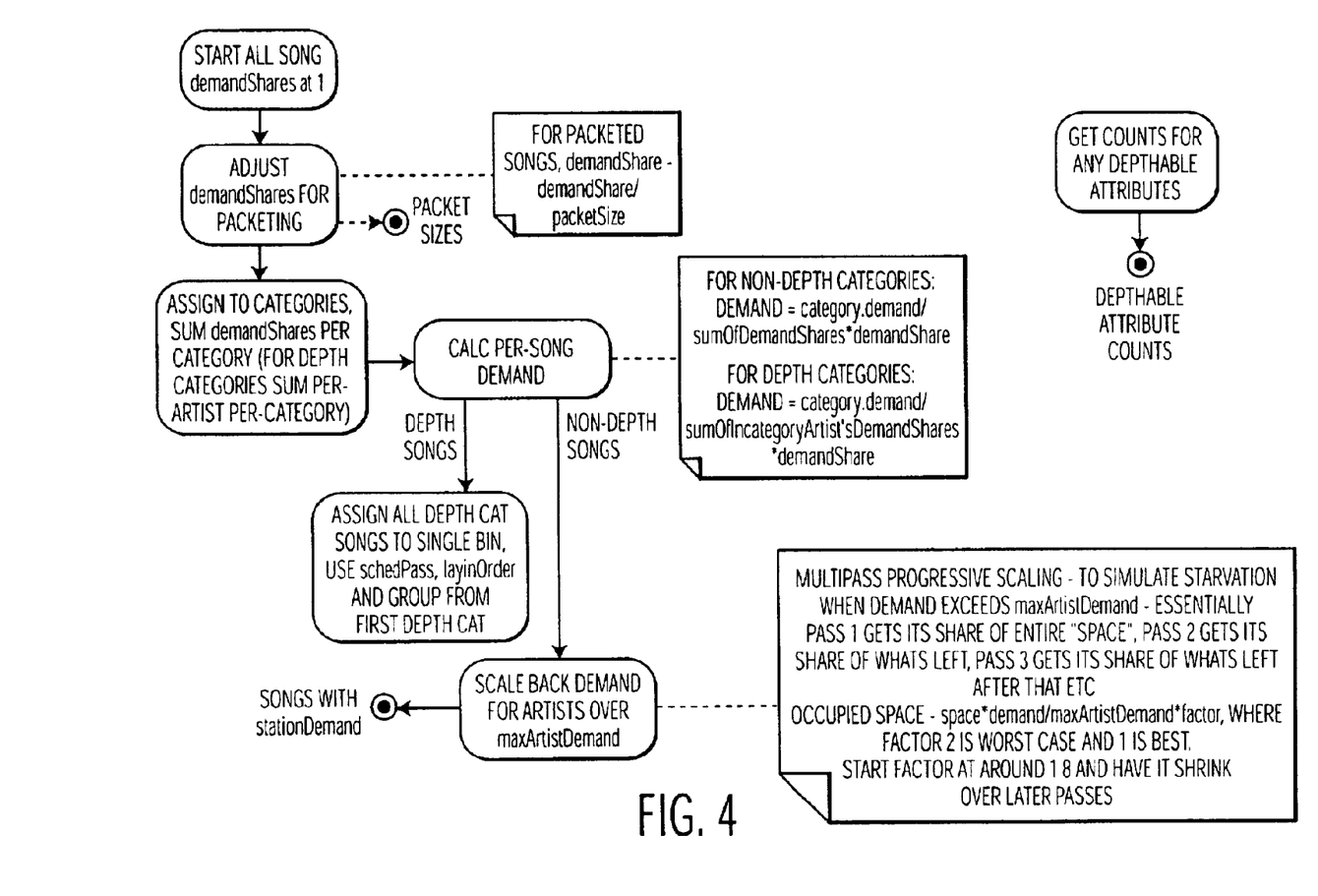
FIG. 4 ("Calculate Station Song Demands") is a block diagram of a portion of the Music Scheduling System of FIG. 2 which concerns the station goals, also part of the preparation process.

After loading the data, the following prep work is done for each station:
    Link category lists are sorted by lastUpdated date/time
    Schedule template entries are sorted by position number
    A count is gathered of the number of occurrences of each link category in the schedule template
    A polymorphic goal object is created for each station goal record, and stored in one of three maps within the station: SpreadGoals, JumpGoals, or LocalGoals (both adjacency and segue goals). The maps are keyed by attribute (number and value). For local goals, if attribute1 and attribute2 are different, two objects are created and stored, one for each attribute.
b. Calculate Station Song Demands (see FIG. 4)
    The objective of this phase is to set an initial demand for each station song such that, if no listener adjustment is made, the song will tend to play with the same frequency it does when the station is scheduled by a radio professional or by an automatic scheduling system. In addition, an initial demand is calculated for any depth songs. This is done once now for efficiency, even though, for any particular listener, the depth songs may not even be considered for play if not 'depthed-in'.
    For each station, the following work is done:
    Each song is given a demandShare of 1
    A count of number of songs in each packet is made
    Any packeted song has its demand share divided by the number of songs in its packet
    For each non-depth category, a sum of demand shares is made. For depth categories, a sum of demand shares per artist is made.
    For non-depth songs, each song's stationDemand is set as follows:
song's stationDemand=song's category's demand (set by the back-office staff based upon the category's share of the clock in the automatic selection system) divided by the song's category's totalDemandShares (just calculated above) multiplied by the song's demandShare (still 1, unless the song is in a packet).
    For depth songs, each song's stationDemand is based upon the artist totalDemand in the category:
depth song's stationDemand=song's category's demand (set by the back-office staff based upon the category's share of the clock in the automatic scheduling system) divided by the song's category's totalDemandShares for its artist (just calculated above) multiplied by the song's demandShare (still 1, unless the song is in a packet).
    At this point, each song has an initial demand based upon its category, that category's membership, and that category's percentage of airtime, including the effects of packeting. However, The automatic selection system does not (cannot) deliver this play frequency for later-pass songs whose artist's total demand exceeds that which can be supported by the artist separation rule.
    During station setup, a maxArtistDemand value is set per station to reflect the settings of artist separation on the station. Multi-pass starvation is simulated using the following algorithm:

Demand is summed per-artist, and per-artist-per-pass.
    For any artist whose total demand exceeds maxArtistDemand, calculate a per-pass scaling factor as in the following pseudocode:

```
space = 1.0
for(first pass through last pass)
    {
    artist.pass.scalefactor = space
    newDemand = space * artist.pass.demand
    space = space - (space * newDemand/maxArtistDemand
        * (MAX_DEMAND_FACTOR
        - (space * newDemand / maxArtistDemand *
MAX_DEMAND_FACTOR)))
    }
Where MAX_DEMAND_FACTOR ~= 1.8
```

Then for any song by an artist whose total demand exceeds maxArtistDemand, scale the song's stationDemand by multiplying by its artist's scale factor for its pass (calculated above)
    At this point the song and station data is in memory, stored for efficient access, and all values that can be precalculated to setup the basis stations have been calculated.
    The remainder of the scheduler activity is conducted upon every request for schedule.
2. Scheduling Preparation
    The schedule is requested through the single entry point to the scheduler object interface:
    GenSched(stationID,listenerID,prefsListenerID, runtimeSetting s,verboseFlag)
    Other than the cached song and station data, the scheduler is stateless. It is presumed that multiple instances will be created on different threads by the web server, and that instances will be created to service the GenSched call and discarded afterwards (normal object activation).
a. Parse Runtime Settings
    The runtime settings are supplied as a string in the following format:
    Ampersand-separated, query string style, where the paramNum is appended onto one of b(ban), d(depth) or s(shift)
    s is followed by =shiftamount (can be positive or negative)
    b&d are followed by =1 for query string conformance
    For example:
    b2=1&d1=1&s3=2&b5=1&s7=-1
    Which means:
    Ban station parameter 2, depth parameter 1, shift parameter 3 up 2, ban parameter 5, shift parameter 7 down 1
    For each supplied setting, a RuntimeSetting object is created and stored in the appropriate one of 3 collections: shifts, bans, or depths
b. Load Listener Data
    Listener data for the single listener requesting schedule is loaded from the database in a single call to the getSchedListenerData stored procedure, which returns 3 recordsets:
    Listener History (songID, lastPlay, playDeficit)
    Listener Songs (songID,shift)
    Listener Artists (artistID, shift, depth)
    The data is stored in 3 corresponding collections.
c. Get Listener-adjusted Songs (see FIG. 5 for Details)
    A pass is made through the stationsongs, a lookup is done in the listenerHistory, listenerSongs and listenerArtists for related data, if any, and a song object is created for each. Listener data is sparse and not every station song/artist will have corresponding listener data unless it has been heard or a preference has been indicated. The stats maps, which contain lastPlay and demandTotal entries for every artist/category/packet/attribute, are updated for last play.

Figure 5:
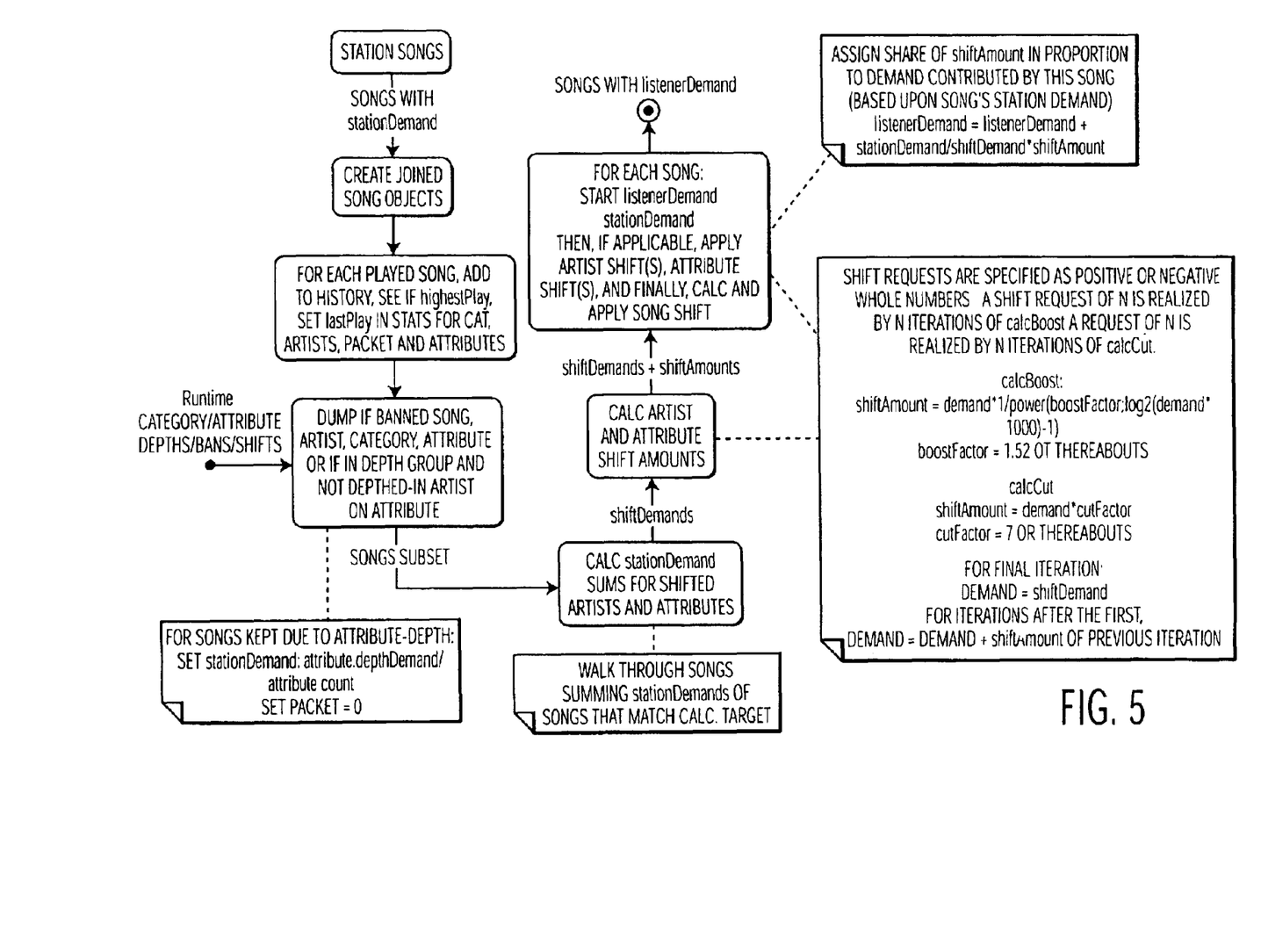
FIG. 5 ("Listener Song Adjustments") is a block diagram of a portion of the Music Scheduling System of FIG. 2 which concerns listener adjustments to the selection of musical performances.

Songs are then dumped if the song, its artist, category, or attribute are banned, or if it is in a depth group and not depthed-in by artist or attribute. Song objects not dumped are added to the list of songs in contention for scheduling this session (the song list). If it is a song depthed-in by attribute, its baselineDemand is set to the demand set on the attribute divided by the number of songs depthed-in by that attribute, otherwise it is set to the stationDemand.

A pass is made through the song list, and total demand is accumulated for every artist and attribute. A pass is made through listenerArtists, and a demand delta (shiftedDemand-totalDemand) is calculated for any artist for which a shift is set, according to the iterative shift algorithm:

```
float CScheduler::calcShiftedDemand(float demand,int shift)
{
    if(shift > 0)
        return boostDemand(demand,shift);
    if (shift < 0)
        return cutDemand(demand,shift);
    return demand;
}
float boostDemand(float demand,int shift)
{
    float magicBoostFactor = 1.52f;
    if(shift > 1)
        demand = boostDemand(demand,shift - 1);
    return demand + demand *
1/pow (magicBoostFactor,log(demand*1000));
}
float cutDemand(float demand,int shift)
{
    float magicCutFactor = 0.7f;
    if(shift < -1)
        demand = cutDemand(demand, shift + 1);
    return demand * magicCutFactor;
}
```

A demand delta for any shifted attributes is calculated similarly.

Another pass is made through songs. listenerDemands are set initially to baselineDemands. Any song effected by an artist or attribute shift has its listenerDemand adjusted by its share of the shift (based upon its contribution to the demand) as follows:

song.listenerDemand+=song.baselineDemand/artistOrAttribute.totalDemand*artistOrAttribute.demand Delta;

Finally, each song that has an explicit song shift has its demand adjusted according to the iterative shift algorithm:

song.listenerDemand=calcShiftedDemand(song.listenerDemand,song.shift);

At this point, the set of station songs has been narrowed to those songs compatible with the listener's preferences and runtime settings, and each song has a listenerDemand that reflects the station baseline transformed by listener and runtime shift requests.

d. Balance Demands

Demand is accumulated per artist. If any artist's demand exceeds the maxArtistDemand, songs by that artist have their demands scaled back to meet it. Note that this is not a pass-sensitive adjustment. Demands are accumulated per group. If any group's demand exceeds the group's demandLimit, songs in that group have their demands scaled back to meet it. Finally, all song demands are summed, and are then scaled so the total demand is 1. At this point the library is 'in balance,' and any test values (spreads etc) derived from it ought to be achievable.

e. Calculate Statistics

Demands are accumulated for every artist, category, packet and attribute and stored in the stats maps.

3. Schedule Generation a. Fill Schedule Positions

Songs are placed in a vector and sorted in next-due order, where next-due=lastPlay+ideal period (and ideal period=1/demand).

Not-yet-heard songs are placed at the beginning of the vector and their order randomized. A vector of schedule entries is created whose size is equal to the number of positions requested. The scheduler undertakes the following operations for each position in the schedule:

A category group spread failure is calculated for each category group and stored in a map for later lookup. Any cached test results are cleared. Each song is considered in turn in the position, subject to an optional depth limit percentage which, as an optimization, constricts how far into songs already heard the search may progress, since the scheduler rarely if ever schedules songs greater than 50% back. A hunger accumulator is set to 0. A bestScore is set to a maximum value. For each song, a score is calculated as follows:

A totalScore accumulator for the song is set to 0. If it is the first time a song is considered in this scheduling run, the set of applicable goals is calculated for the song.

CategoryGroupSpread, ArtistSpread, Hunger and Saturation always apply. If the song has a second artist, Artist2Spread applies; if it is in a packet, PacketSpread applies. In addition, any attribute goal whose value setting matches the value of that attribute on the song applies. The applicable goals are placed in a list on the song and sorted in points order, higher valued goals first. A pointsInPlay value is set to be the sum of the points assigned to the applicable goals.

If the song has been heard before, a delta value, expressing the difference between the song's placement at this position and its ideal period as a percentage, is set as follows:

idealSep=1/song→listenerDemand;
delta=thisPosition.play−song→lastPlay−idealSep;
delta=delta*100/idealSep;

If the song has not yet been heard, its delta is 0. If a song's delta exceeds a certain threshold, currently 100, it is set to 0, on the presumption that this extraordinarily high delta is the result of a re-introduction of a song after a listening period during which it had been banned.

For each applicable goal, a test is conducted for the current song in the current position. (Goal types and their tests are discussed above) The goal's test function yields a floating point value, which is multiplied by the points for that goal, then squared. This value is added to the totalScore accumulator. The totalScore is then scaled (divided by the pointsInPlay) and compared to the bestScore. If it is greater or equal, this song cannot ultimately score better than the best song found so far, so, as an optimization, testing of the rest of the applicable goals is aborted. If, after testing all the applicable goals, the scaled totalScore is less than the best score, and the song passes any hard rules (currently DMCA and hardArtistSeparation), this is the best song so far, and its scaled score becomes the bestScore.

If the song has a positive playDeficit, it is added to the hunger accumulator. If a song has a positive delta, it is added to the hunger accumulator.

After all songs are considered in the position, the best song (with the lowest scaled score) is placed in the schedule entry, along with details of its test results. The best song has its playDeficit recalculated as follows:

playDeficit=(playDeficit*DEFICIT_SCALING+delta)
*DEFICIT_DAMPING/DEFICIT_SCALING Where DEFICIT_SCALING=4 and DEFICIT_DAMPING=0.8

The best song has its lastPlay set to the schedule position. It is removed from the song list, a new next-due is calculated, and it is placed back in the song list in next-due order. The next schedule position is then considered.

b. Update the Database

After the schedule is filled, the database is updated in a single transaction:

An entry is created in StationListenerSessions recording the StationListenerID, and date/time The StationListenerUndo table has all entries older than the DMCA window dropped For each song in the schedule, an entry is created/updated in StationListenerHistory, with the lastPlay and playDeficit values from this scheduling session.

For each song in the schedule, an entry is created in StationListenerUndo (to support DMCA and schedule abandonment tracking), with the lastPlay and playDeficit, values from this scheduling session, as well as priorPlay and priorDeficit, values entering this scheduling session.

c. Integrate Links/Spots and Return Schedule

An in-memory recordset is created. For each entry in the schedule template a record is created in the recordset. Song entries in the template yields records of type Song, with fields for songid, title, artist, test results etc. For link entries, a link is chosen from the called-for link category using modulus arithmetic to achieve rotation, and a record is created of type Link, with any link-related data. For spot entries, a record with type Spot is created, with any spot related data. The recordset is returned in the retval of the GenSched object call. All cleanup is accomplished via stack unwinding and object lifetime.

There has thus been shown and described a novel Music Scheduling System which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of selecting and producing schedules of media performances (MPs) for play within a plurality of successive schedule positions (SPs) from among a finite plurality of MPs (MPSETs), each MP being associated with a demand value (MPD), such that the sum of the MPDs for all MPs in the MPSET is equal to a constant K, and zero or more attributes (ATTR) from a plurality of attributes, said method minimizing the failure value (FV) of one or more scheduling goals (GOALs), from a finite plurality of GOALs (GOALSET), each GOAL having a goal type (GT) and an importance value (IV), said method comprising the steps of:

(a) storing the identity of each MP with its associated demand value (MPD) and its associated attributes (ATTRs), if any;

(b) storing the identity of each GOAL with its associated goal type (GT) and its associated importance value (IV);

(c) assigning the MPs to play in individual ones of said successive SPs, with one MP scheduled to play in each SP, such that for each SP, the assigned MP has the lowest failure value (FV) of the MPSET;

wherein the failure value (FV) for each respective MP in a given SP is calculated in accordance with the formula:

$FV=TS/TIV$ where TS is the sum of scores (Ss) of the applicable GOALs (AG), and TIV is the sum of the importance values (IVs) of the AGs, where an AG is any GOAL that applies to all MPs or any GOAL that applies to any of the attributes associated with the MP, and where the score (S) for each respective AG is the square of the degree of failure (DF) of the MP to satisfy the AG in the SP times the IV of the AG (S=(DF*IV)5), where DF is the result of a test for the given GT and is dependent upon the respective MP and the given SP (DF=$\text{Test}_{GT}$(MP, SP));

whereby the number of SPs between successive scheduled SPs in which each respective MP is scheduled to play (MPERIOD) is as close as possible to the constant K divided by the demand value MPD for that respective MP; and whereby the number of the SPs occupied by each respective MP divided by the total number of SPs during a given range of successive SPs is as close as possible to the demand value MPD for that MP divided by K.

2. The method defined in claim 1, wherein each SP is associated with a sequentially assigned play number (PLAY), said method further comprising the step of sorting the MPs into a consideration list in next due order (NEXTDUE) prior to consideration for assignment to a particular SP, where

NEXTDUE=LASTPLAY+IDEALPERIOD where LASTPLAY is the PLAY of the nearest prior SP to which the MP was assigned, or zero if the MP was not previously assigned, and where

IDEALPERIOD=(1/(MPD/K)), wherein the FV for each of a plurality of MPs is calculated in the NEXTDUE order and the calculation of TS for any given MP is aborted when it exceeds the minimum FV thus far determined.

3. The method defined in claim 2, wherein each MP is associated with a play deficit (DEFICIT); wherein there is a goal type (GT) "hunger" for a goal in the GOALSET that applies to all MPs, where the DF Test result of the GT "hunger" is the sum of the positive DEFICITs of the MPs in the consideration list preceding the MP being tested, divided by the sum of positive DEFICITs of all MPs in the MPSET; and wherein there is a goal type (GT) "saturation" for a goal in the GOALSET that applies to all MPs, where the DF Test result of saturation is the absolute value of the DELTA divided by 100 when DELTA is negative and is zero otherwise; said method further comprising the steps of:

(d) storing the play deficit in association with each respective MP;

(e) initializing the DEFICIT for each MP to zero;

(f) updating the DEFICIT for an MP upon assignment of the respective MP to a SP in accordance with the formula;

$$DEFICIT_{new}=(DEFICIT_{old}*DEFICIT\_SCALING+DELTA)*DEFICIT\_DAMPING/DEFICIT\_SCALING$$

where DELTA=(SP.PLAY B LASTPLAY B IDEALPERIOD)*100/IDEALPERIOD,
and DEFICIT_SCALING and DEFICIT_DAMPING are constants.

4. The method defined in claim 1, wherein each SP is associated with a sequentially assigned play number (PLAY), wherein there is a goal type (GT) "spread" for at least one of the goals in the GOALSET, said at least one goal having an associated attribute ATTR and applying to all MPs associated with the same ATTR, where the DF Test result of Aspread@ is calculated in accordance with the formula:

$$DF_{spread}=MAX(0, 1-(SP.PLAY\ B\ LASTPLAY\_ATTR)/ATTRPERIOD)$$

where ATTRPERIOD is K divided by the sum of the MPDs for those MPs associated with that ATTR,
and LASTPLAY_ATTR is the PLAY of the nearest prior SP to which an MP associated with the ATTR was assigned, or zero if no MP associated with the ATTR was previously assigned.

5. The method defined in claim 1, wherein each SP is associated with a sequentially assigned play number (PLAY), and wherein LASTPLAY is the PLAY of the nearest prior SP to which the MP was assigned, or zero if the MP was not previously assigned, said method further comprising the step of storing the LASTPLAY of each MP in association with the respective MP.

6. The method defined in claim 1, wherein the MP is a musical performance.

7. The method defined in claim 1, wherein the MP is an advertisement.

8. The method defined in claim 1, wherein the MP is a video performance.

9. The method defined in claim 1, wherein the MP is an audio performance.

10. The method defined in claim 1, wherein the MP is an animation.

11. The method defined in claim 1, wherein the MP is a web page element.

12. The method defined in claim 1, wherein the MP is a web page.

13. The method defined in claim 1, wherein each MP is associated with one of a plurality of categories of music, and wherein step (a) includes the steps of:
(1) storing the music category in association with each respective MP;
(2) calculating the demand value MPD for each respective MP in accordance with the formula:

$$MPD=CD/N \times DS,$$

where
MPD is the demand value for a given MP,
CD is the station demand for the category associated with the given MP;
N is the total number of MPs associated with the category; and
DS is a prescribed demand share for the given MP.

14. The method defined in claim 13, wherein DS is set equal to a constant.

15. The method defined in claim 14, wherein DS=1.

16. The method defined in claim 13, wherein at least one subset of said plurality of MPs forms a packet of affiliated MPs, and wherein DS is set equal to a constant for each MP that is not in a packet and is set equal to this constant divided by P for each MP that is in the packet, where P is the total number of MPs in the packet.

17. The method defined in claim 16, wherein the constant equals 1.

18. The method defined in claim 13, wherein each MP is associated with at least one of a plurality of artists, wherein some of said plurality of MPs are included for depth, and wherein the demand value of each depth MP is separately calculated in accordance with the formula:

$$MPD_d=CD/TAD \times DS,$$

where $MPD_d$ is the demand value for the depth MP and TAD is the total artist demand for the respective artist and category, which equals the DS sum for all the MPs of the respective category performed by the respective artist.

19. The method defined in claim 1, wherein each MP is performed by at least one of a plurality of artists, said method further comprising the steps of:
(d) storing an initial maximum artist demand for at least one of said plurality of artists;
(e) adjusting the demand value MPD for each of said MPs performed by said at least one artist in dependence upon an initial MP demand for the respective MP and the maximum artist demand for the respective artist who performed that MP.

20. The method defined in claim 19, wherein said adjusting step (e) comprises the steps of:
(1) summing all the MPDs for MPs performed by each respective artist to yield a total MP demand for that artist;
(2) comparing the total of all MPDs for each respective artist to the maximum artist demand for that artist;
(3) if the total of all MPDs for a given artist is less than the maximum artist demand for that artist, allowing the MPDs for MPs performed by that artist to remain unchanged; and
(4) if the total of all MPDs for a given artist is greater than the maximum artist demand for that artist, decreasing the MPDs for MPs performed by that artist.

21. The method defined in claim 20, wherein steps (1)–(4) are repeatedly carried out until all total MPDs are less than the respective maximum artist demands for each respective artist.

22. The method defined in claim 21, wherein the maximum artist demand for each of the artists is the same.

23. The method defined in claim 21, wherein each category is associated with a pass number, wherein the MPDs are decreased in step (4) by multiplying by a scaling factor associated with the pass associated with the category associated with the respective MP and wherein the scaling factor is determined by the formula:

```
space = 1.0
for(first pass through last pass)
    {
    artist.pass.scalefactor = space
    newDemand = space * artist.pass.demand
    space = space - (space * newDemand/maxArtistDemand
        * (MAX_DEMAND_FACTOR
        - (space * newDemand / maxArtistDemand *
MAX_DEMAND_FACTOR)))
    }
``` where artist.pass.demand is the sum of the MPDs whose associated category is associated with that pass,
where maxArtistDemand is the maximum artist demand, and
where MAX_DEMAND_FACTOR is a constant.

24. The method defined in claim 23, wherein MAX_DEMAND_FACTOR=1.8.

25. The method defined in claim 3, wherein a separate schedule with independent SPs is created for each individual consumer, said method further comprising the steps of varying LASTPLAY and DEFICIT for each consumer, for each MP.

26. The method defined in claim 25, wherein the consumer can elect to ban at least one of the MPs, causing any such banned MPs to be removed from the MPSET.

27. The method defined in claim 25, wherein the consumer can elect to ban at least one of the ATTRs, causing any MPs associated with such banned ATTRs to be removed from the MPSET.

28. The method defined in claim 3, wherein a separate schedule with independent SPs is created for each individual consumer, wherein one or more categories are designated depth categories, and wherein each MP associated with said one or more categories is included for depth only if the consumer elects to include at least one of the respective MP's associated artists, and wherein each MP associated with said one or more categories is removed from the MPSET if it is not included for depth.

29. The method defined in claim 25, wherein the consumer can elect to boost the play of one or more MPs, said method comprising the additional steps of:
 a) storing the boost amount (BOOST) for one or more MPs; and
 b) adjusting the MPDs for said one or more MPs in accordance with the formula:

MPDnew=boostDemand(MPDold,BOOST), where boostDemand is determined by the formula:

```
boostDemand(demand, shift)
{
if(shift > 1)
    demand = boostDemand(demand,shift - 1);
return demand + demand *
1/pow(BOOST_FACTOR,log(demand*BOOST_SCALING));
},
``` where BOOST_FACTOR and BOOST_SCALING are constants.

30. The method defined in claim 29, where BOOST_FACTOR=1.52.

31. The method defined in claim 29, where BOOST_SCALING=1000.

32. The method defined in claim 25, wherein the consumer can elect to boost one or more ATTRS, said method comprising the additional steps of:
 a) storing the boost amount (ATTR_BOOST) for one or more ATTRs; and
 b) adjusting the MPDs for MPs associated with said ATTRs in accordance with the formula:

MPDnew=MPDold+(MPDold/ATTR_DEMAND*ATTR_DELTA), where ATTR_DEMAND is the sum of the MPDs for all MPs associated with the ATTR,
and ATTR_DELTA is calculated in accordance with the formula:

ATTR_DELTA=boostDemand(ATTR_DEMAND, ATTR_BOOST)-ATTR_DEMAND, where boostDemand is determined by the formula:

```
boostDemand(demand, shift)
{
if(shift > 1)
    demand = boostDemand(demand, shift - 1);
return demand + demand *
1/pow(BOOST_FACTOR, log(demand*BOOST_SCALING));
}
``` where BOOST_FACTOR and BOOST_SCALING are constants.

33. The method defined in claim 32, where BOOST_FACTOR=1.52.

34. The method defined in claim 32, where BOOST_SCALING=1000.

35. The method defined in claim 25, wherein the consumer can elect to reduce one or more MPs, said method comprising the additional steps of:
 a) storing a reduce amount (REDUCE) for one or more MPs; and
 b) adjusting the MPDs for said MPs in accordance with the formula:

MPDnew=MPDold*(REDUCE_FACTOR raised to the REDUCE power), where REDUCE_FACTOR is a constant.

36. The method defined in claim 35, where REDUCE_FACTOR=0.7.

37. The method defined in claim 25, wherein the consumer can elect to reduce one or more ATTRs, said method comprising the additional steps of:
 a) storing a reduce amount (ATTR_REDUCE) for one or more ATTRs; and
 b) adjusting the MPDs for MPs associated with said ATTRs in accordance with the formula:

MPDnew=MPDold+(MPDold/ATTR_DEMAND*ATTR_DELTA), where ATTR_DEMAND is the sum of the MPDs for all MPs associated with the ATTR,
and ATTR_DELTA is calculated in accordance with the formula:

ATTR_DELTA=(ATTR_DEMAND*(REDUCE_FACTOR raised to the ATTR_REDUCE power))-ATTR_DEMAND.

38. The method defined in claim 37, where REDUCE_FACTOR=0.7.

* * * * *